United States Patent
Onishi (10) Patent No.: US 7,946,024 B2
(45) Date of Patent: May 24, 2011

(54) METHOD OF MANUFACTURING A CAN ASSEMBLY OF AN ENHANCED CORELESS ALTERNATING CURRENT LINEAR MOTOR

(75) Inventor: Yoshinori Onishi, Sakai-gun (JP)

(73) Assignee: Sodick Co., Ltd., Yokohama, Kanagawa (JP)

( * ) Notice: Subject to any disclaimer, the term of this patent is extended or adjusted under 35 U.S.C. 154(b) by 34 days.

(21) Appl. No.: 12/337,605

(22) Filed: Dec. 17, 2008

(65) Prior Publication Data

US 2009/0133245 A1  May 28, 2009

Related U.S. Application Data

(62) Division of application No. 10/535,695, filed as application No. PCT/JP2004/011125 on Jul. 28, 2004, now abandoned.

(30) Foreign Application Priority Data

Jul. 28, 2003 (JP) .................................. 2003-280592

(51) Int. Cl.
*H02K 19/00* (2006.01)
*H02K 9/00* (2006.01)

(52) U.S. Cl. ............................ 29/596; 29/732; 310/58

(58) Field of Classification Search ............ 29/596–598, 29/729, 739, 732–736; 310/12.13–12.18, 310/112, 156.01, 156.56, 58
See application file for complete search history.

(56) References Cited

U.S. PATENT DOCUMENTS

| | | | |
|---|---|---|---|
| 5,723,917 A | 3/1998 | Chitayat | |
| 5,751,077 A * | 5/1998 | Gonzalez | 310/12.29 |
| 6,407,471 B1 * | 6/2002 | Miyamoto et al. | 310/12.06 |
| 6,495,934 B1 | 12/2002 | Hayashi et al. | |
| 6,657,326 B1 | 12/2003 | Yamamoto et al. | |
| 6,657,327 B2 | 12/2003 | Tajima | |
| 6,977,451 B2 | 12/2005 | Onishi | |
| 2003/0020340 A1 | 1/2003 | Shikayama et al. | |
| 2003/0155818 A1 | 8/2003 | Koyanagawa et al. | |
| 2004/0016297 A1 | 1/2004 | Paul et al. | |
| 2004/0032170 A1 | 2/2004 | Tamai et al. | |
| 2004/0080217 A1 | 4/2004 | Ota et al. | |

FOREIGN PATENT DOCUMENTS

| | | |
|---|---|---|
| JP | 6-41381 U | 5/1994 |
| JP | 6-70484 U | 9/1994 |
| JP | 2000-312465 A | 11/2000 |

OTHER PUBLICATIONS

"Stainless Steel," http://en.wikipedia.org/wiki/Stainless_steel, printed Jun. 3, 2008.

* cited by examiner

*Primary Examiner* — Minh Trinh

(74) *Attorney, Agent, or Firm* — McDermott Will & Emery LLP

(57) ABSTRACT

A method of manufacturing a can assembly of a coreless AC linear motor is provided. The method includes the steps of providing a workpiece and gouging out material from the workpiece to form a deep groove in the workpiece. The workpiece having the deep groove forms a can. The method also includes providing a plurality of coreless coils and arranging the plurality of coreless coils in a straight line. The method also includes forming the plurality of coreless coils into a flat plate-shaped block using resin or adhesive. The flat plate-shaped block forms a coil assembly. The method also includes inserting the coil assembly into the deep groove of the can. The can assembly comprises the can and the coil assembly.

5 Claims, 6 Drawing Sheets

METHOD OF MANUFACTURING A CAN ASSEMBLY OF AN ENHANCED CORELESS ALTERNATING CURRENT LINEAR MOTOR

CROSS-REFERENCE TO RELATED APPLICATIONS

The present application is a divisional of U.S. patent application Ser. No. 10/535,695, which is the National Stage of International Application No. PCT/JP2004/011125 filed on Jul. 28, 2004, the disclosure of each of which are hereby incorporated by reference in their entireties for all purposes.

FIELD OF THE INVENTION

The present invention relates to linear motors and, more particularly, relates to a coreless alternating current ("AC") linear motor used in a clean room or vacuum environment, for use in a semiconductor manufacturing plant or in a plant which manufactures substrates for liquid crystal displays ("LCDs").

DESCRIPTION OF THE RELATED ART

In the manufacture of semiconductors or LCD substrates, coreless AC linear motors, which are capable of generating large thrust and which have no cogging ascribable to a core, are particularly well suited due to their capability for accurate positioning. In general, a coreless AC linear motor includes a pair of parallel side yokes to which a plurality of field magnets are fixed, and a plurality of coreless coils arranged in a straight line between the pair of parallel side yokes. A plurality of coreless coils are formed into a flat, plate-shaped block, and covered by resin. Formed in this manner, the coil assembly is able to move while maintaining a small gap between it and the field magnets.

In a semiconductor or LCD substrate manufacturing plant, coreless AC linear motors are used in vacuum vessels. Under vacuum conditions, gas (known as "outgas") is often emitted from the resin of the coil assembly when the coil assembly is heated. These outgases contaminate the vacuum environment and cause a lowering of device performance and can, for example, attach to the lens surface of an electron microscope and become burned on to the surface of a sample or product.

Japanese Utility Model Laid-Open Nos. 6-41381 and 6-70484 disclose a coil assembly housed inside a can which is used to prevent this type of outgas, where the can is manufactured by joining steel plates using tungsten inert gas ("TIG") welding or brazing. Using this approach, pin holes can easily form in the joins, where the penetrating through-holes leak outgas to the outside of the can. Furthermore, even if the pin holes do not pass completely through the joins, air and welding gas can build up inside the pin holes, requiring expulsion.

Accordingly, it is desirable to provide for a coreless AC linear motor which overcomes the deficiencies of conventional linear motors. More particularly, it is desirable to provide for a coreless linear motor having a plurality of coreless coils housed inside an airtight can, which substantially reduces gas accumulations.

SUMMARY OF THE INVENTION

The present invention relates to linear motors and, more particularly, relates to a coreless AC linear motor used in a clean room or vacuum environment, for use in a semiconductor manufacturing plant or in a plant which manufactures LCD substrates. The coreless linear motor has a plurality of coreless coils housed inside an airtight can, where the can is manufactured without welding or brazing.

According to one arrangement, the present invention is a coreless AC linear motor, including a can assembly and a magnet assembly. The can assembly further includes a can, a coil assembly, a hardened epoxy resin, a cover body, an O-ring, an inlet joint, an outlet joint, a plurality of lead lines, a cover body block, a current introduction terminal, and a vacuum flange. The can, which has a T-shaped cross-section, further includes a U-shaped coil housing section forming a deep groove within, and a flange section forming a flange recess and a flange O-ring seat.

The coil assembly, which is disposed in the can, further includes a plurality of flat three-phase coreless coils, the plurality of coils overlapping each other, a first manifold, a second manifold, and a plurality of cooling pipes. The first manifold includes a vertical manifold cooling medium inlet passage, and a first brim section, the first brim section connecting the first manifold to the flange recess. The a second manifold, which is obverse to the first manifold, further includes a vertical manifold cooling medium outlet passage, and a second brim section, the second brim section connecting the second manifold to the flange recess. The plurality of cooling pipes are in physical communication with and pass through each of the plurality of coreless coils, the plurality of cooling pipes connected to the first and second manifolds, where the plurality of cooling pipes distribute a cooling medium from the manifold cooling medium inlet passage to the manifold cooling medium outlet passage. The hardened epoxy resin encapsulates the plurality of coreless coils, the first and second manifolds, and the plurality of cooling pipes.

The cover body, which is affixed to the flange section using a plurality of bolts, forms a recess on an interior portion of the can assembly, a cover body O-ring seat, a resin injection hole, a terminal introduction hole, a cover body cooling medium inlet passage in physical communication with the manifold cooling medium inlet passage, and a cover body cooling medium outlet passage in physical communication with the manifold cooling medium outlet passage. The cover body further includes a terminal block housed in the recess. The O-ring is in physical communication with and between the flange O-ring seat and the cover body O-ring seat, where the O-ring seals the can to the cover body in an air-tight manner. The inlet joint is in physical communication with the cover body cooling medium inlet passage, and the outlet joint is in physical communication with the cover body cooling medium outlet passage. The plurality of lead lines is in physical communication with the plurality of coils, where the plurality of lead lines passes through the terminal block to an exterior side of the cover body obverse to the recess.

The cover body block is affixed to the cover body in an air-tight manner using an O-ring, where the cover body block forms an introduction passage adjacent to the terminal introduction hole. The current introduction terminal is affixed to the cover body block in an air-tight manner using an O-ring, where the current introduction terminal includes U-, V-, W- and E-phase terminals. The vacuum flange is in physical communication with and between the cover body block and the current introduction terminal.

The magnet assembly further includes first and second side yokes, the first and second side yokes arranged parallel with each other, a center yoke connecting the first and second side yokes, and a plurality of permanent magnets affixed to facing portions of the first and second side yokes and forming a magnetic gap therebetween, where adjacent ones of the plurality of permanent magnets have alternating magnetic poles.

Each of the plurality of cooling pipes has an outer diameter of 4 millimeters, a thickness of 0.5 millimeters, and a length of 250 millimeters. Adjacent ones of the plurality of cooling pipes are separated by 0.5 millimeters. The coil assembly further includes first through seventh cooling pipes. The plurality of flat three-phase coreless coils are arranged in U-phase, V-phase, and W-phase, in a movement direction.

The can is 8 mm thick. The first and second manifolds are comprised of austenitic stainless steel, where the austenitic stainless steel is defined by Japanese Industrial Standards SUS300 or Japanese Industrial Standards SUS200.

The deep grove is 8.5 millimeters wide, 70 millimeters deep, and 280 millimeters long. The coil housing section is 12.5 mm wide, 80 millimeters deep, and 296 millimeters long. The coil housing section has a side wall thickness of 2.0 millimeters.

According to a second arrangement, the present invention is a method of manufacturing a coreless AC linear motor, including the steps of winding approximately seventy-six turns of enamel-plated copper wire of $\phi$ 0.44 millimeters on a temporary frame having a cross-section of 17 millimeters×50 millimeters, removing the temporary frame to form a plurality of coreless coils, each of the plurality of coreless coils forming a through-hole, overlapping the plurality of coreless coils with each other, and placing a plurality of cooling pipes through each of the through-holes, the plurality of cooling pipes in physical communication with the plurality of coreless coils.

The method also includes the steps of connecting a first end of the plurality of cooling pipes to a vertically-extending cooling medium inlet in a first manifold, connecting a second end of the plurality of cooling pipes, obverse to the first end, to a vertically-extending cooling medium outlet in a second manifold, placing the plurality of coils, the plurality of cooling pipes, and the first and second manifolds in a mold, filling the mold with an epoxy resin, and hardening the epoxy resin to form a resin block.

The method further includes the step of finishing the resin block, inserting the resin block into a U-shaped coil housing section of a T-shaped can, sealing a flange section of the can to a cover body in an air-tight manner by seating an O-ring in O-ring seats formed in the flange section to the cover body, filling additional epoxy resin into the can via a resin injection hole in the cover body, and securing the cover body to an O-ring seat formed in the flange section of the can using bolts.

Additionally, the method includes the steps of connecting the first and second manifolds to a flange recess formed in the flange section of the can, via brim sections, passing lead lines from the plurality of coils through a terminal block on the cover body, connecting a first and a second parallel side yoke with a center yoke, and affixing a plurality of permanent magnets to facing portions of the first and second side yokes to form a magnetic gap therebetween, adjacent ones of the plurality of permanent magnets having alternating magnetic poles.

The first and second manifolds are connected to the flange section using bolts. The plurality of cooling pipes are connected to the first and second manifolds by silver brazing or tungsten inert gas welding. The copper wires is of $\phi$ 0.44 millimeters. The temporary frame has a cross-section of 17 millimeters×50 millimeters.

According to a third arrangement, the present invention is a coreless AC linear motor, including a magnet assembly forming a magnetic gap, and a can, the can further including a coil housing section forming a deep groove. The motor also includes a plurality of coreless coils inserted into the deep groove and arranged in a straight line inside the magnetic gap, and a cover body for sealing the can.

The material is stainless steel. The magnet assembly includes parallel rows of field magnets. The magnet assembly includes a pair of parallel side yokes to which the rows of field magnets are attached. Each coreless coil is overlapped on another coreless coil.

The coreless AC linear motor further includes cooling pipes passing through the coreless coils. The cooling pipes come into contact with inner surfaces of each coreless coil. A plurality of spaced cooling pipes extend through the coreless coils parallel to each other, where the plurality of cooling pipes come into contact with inner surfaces of each of the plurality of coreless coils.

The can includes a flange section which is wider than the coil housing section and joined to the cover body. The motor further includes an O-ring for sealing between the can and the cover body in an air-tight manner, where the flange section further includes a seat for receiving the O-ring. The plurality of coreless coils are fixed to the can using resin or adhesive.

According to a fourth arrangement, the present invention is a method for manufacturing a coreless AC linear motor, including the steps of gouging out material for a can to form a deep groove, and a arranging a plurality of coreless coils in a straight line. The method also includes the steps of forming the plurality of coreless coils into a flat plate-shaped block using resin or adhesive, and inserting the flat plate-shaped block into the deep groove of the can.

The material is stainless steel. The gouging step includes a step of machining a deep groove using an electrode tool, rough machining a deep groove using an end mill, and/or rough machining a deep groove using a drill.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE INVENTION

The present invention provides for a coreless AC linear motor which overcomes the deficiencies of conventional linear motors. More particularly, the present invention provides for a coreless linear motor having a plurality of coreless coils housed inside an airtight can, which substantially reduces gas accumulations.

Figure 1:
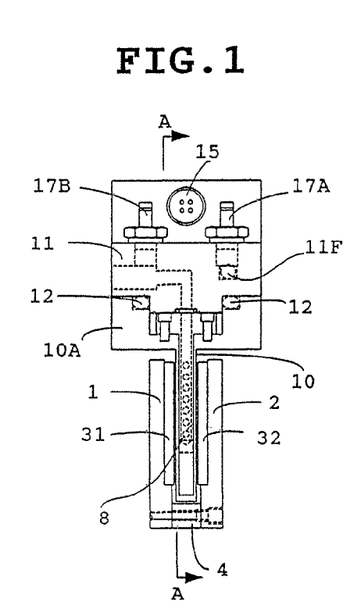
FIG. 1 depicts a front elevation of a coreless AC linear motor according to the present invention.
Figure 2:
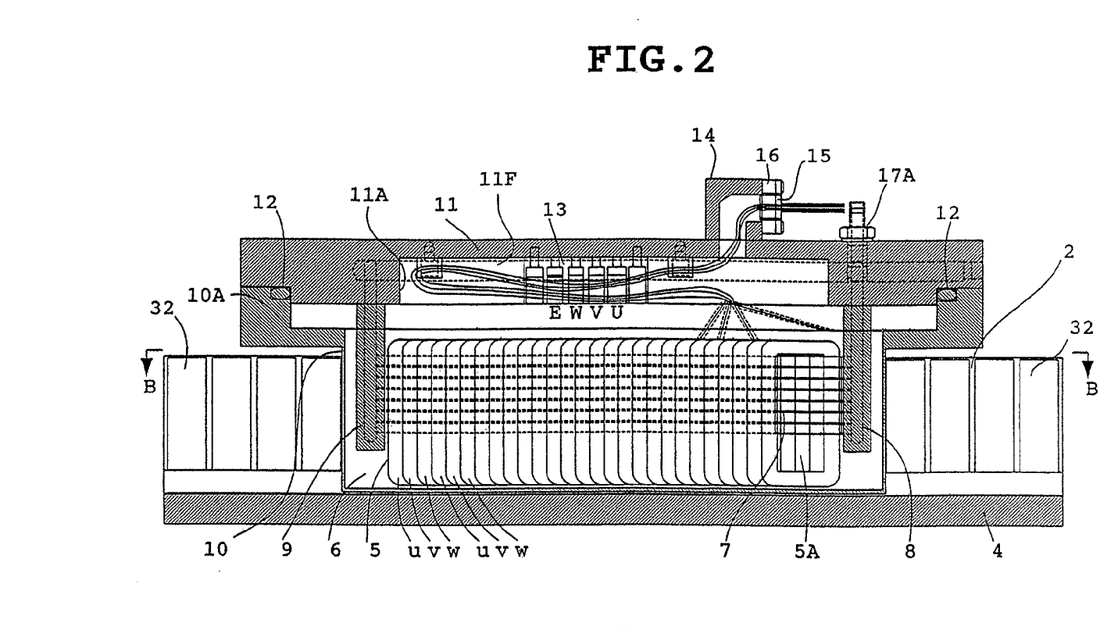
FIG. 2 depicts is a side cross-section of the FIG. 1 linear motor viewed along line A-A (from FIG. 1)
Figure 3:
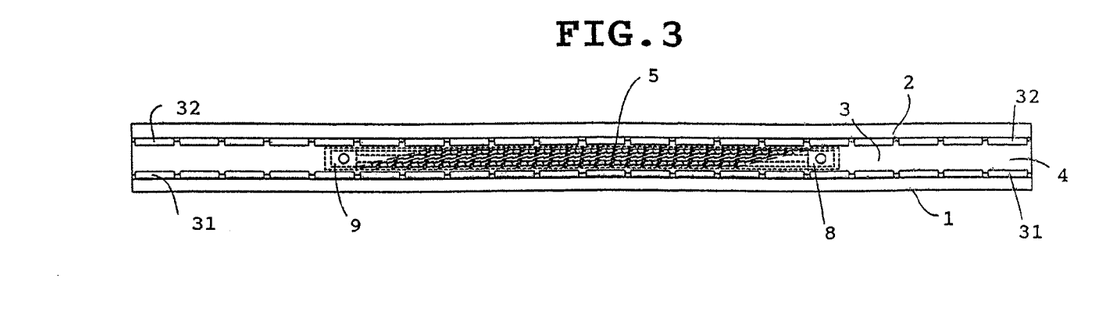
FIG. 3 depicts a plan view of the FIG. 1 linear motor, viewed along line B-B (from FIG. 2)

FIG. 1 depicts a front elevation of a coreless AC linear motor according to the present invention, FIG. 2 depicts a side cross-section of the FIG. 1 linear motor viewed along line A-A (from FIG. 1), and FIG. 3 depicts a plan view of the FIG. 1 linear motor, viewed along line B-B (from FIG. 2). Briefly, the coreless AC linear motor includes a can assembly and a magnet assembly. The can assembly further includes a can, a coil assembly, a hardened epoxy resin, a cover body, an O-ring, an inlet joint, an outlet joint, a plurality of lead lines, a cover body block, a current introduction terminal, and a vacuum flange.

The canned coreless AC linear motor includes a coil assembly which includes a primary side armature, and a magnet assembly including a secondary side field magnet. The coil assembly contains plurality of flat three phase coreless coils 5, and moves in a sideways direction in FIGS. 2 and 3 with respect to the magnet assembly. Plurality of coreless coils 5 are arranged in magnetic gap 3, in a movement direction in the order U-phase, V-phase, W-phase.

In order to increase coil density, each of plurality of coils 5 is overlapped on another coil. Each of plurality of coils 5 is formed by winding approximately seventy-six turns of enamel plated copper wire of $\phi$ 0.44 mm on a temporary frame having a cross-section of 17 millimeters×50 millimeters. When the temporary frame is pulled out, an empty space corresponding to through-hole 5A remains.

A plurality of cooling pipes 7 pass through each of the through-holes 5A extending in a movement direction, while contacting the inner surface of each of the plurality of coreless coils 5. One end of a cooling pipe 7 is connected to a manifold 8, while the other end is connected to a manifold 9. A coil 5, manifold 8, manifold 9 and cooling pipes 7 are integrated by enclosing these parts in a mold, and filling the mold with epoxy resin or adhesive 6. The epoxy resin is hardened to form a coil assembly covered with resin.

The formed resin block is finished so that the coil assembly can form an appropriate air gap with respect to permanent magnets 31 and 32. According to one embodiment, the thickness of the coil assembly is 8 millimeters in the magnetic gap 3.

Figure 4:
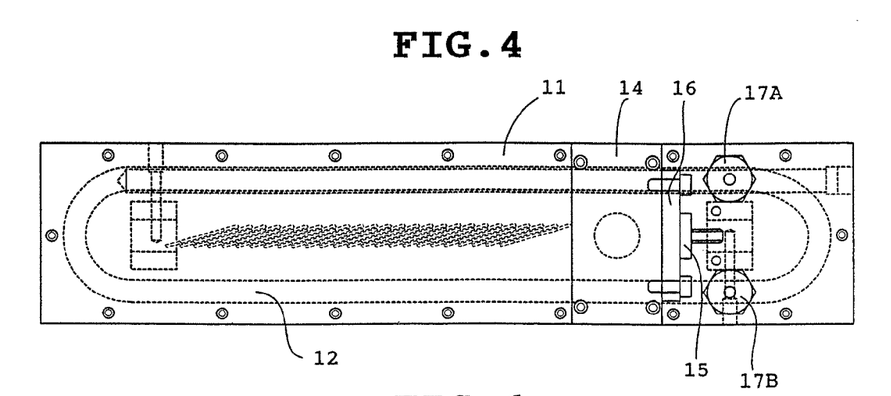
FIG. 4 depicts a plan view of the coil assembly of the FIG. 1 linear motor, where the coil assembly is housed in a can.

FIG. 4 depicts a plan view of the coil assembly of the FIG. 1 linear motor, where the coil assembly is housed in a can. In particular, the coil assembly is housed inside a thin can 10, and the can 10 is sealed with a cover body 11. As shown in FIGS. 1, 2 and 4, an O-ring 12 seals between the can 10 and the cover body 11 in an air-tight manner. The coil assembly, can 10 and cover body 11 are integrated by filling additional resin into the can 10.

Figure 5:
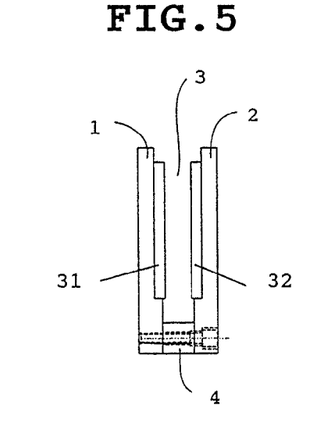
FIG. 5 depicts a front elevation of the magnet assembly of the FIG. 1 linear motor.
Figure 6:
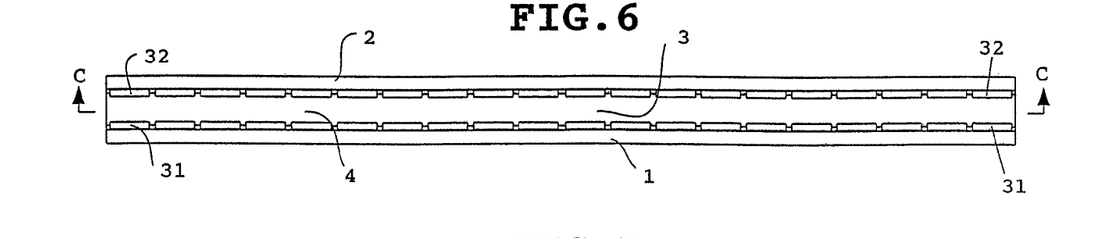
FIG. 6 depicts a plan view of the FIG. 5 magnet assembly.
Figure 7:
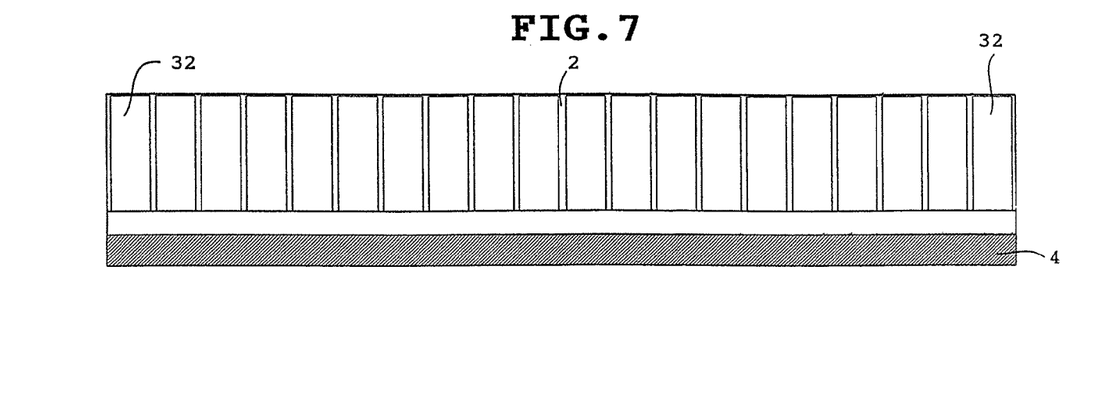
FIG. 7 depicts a side cross-section of the FIG. 5 magnet assembly, viewed along line C-C (from FIG. 6)

FIG. 5 depicts a front elevation of the magnet assembly of the FIG. 1 linear motor, FIG. 6 depicts a plan view of the FIG. 5 magnet assembly, and FIG. 7 depicts a side cross-section of the FIG. 5 magnet assembly, viewed along line C-C (from FIG. 6). As shown in FIGS. 5 to 7, the magnet assembly includes spaced side yokes 1 and 2, a center yoke 4, and plurality of permanent magnets 31 and 32. Pair of side yokes 1 and 2 are arranged parallel to each other, and are connected by center yoke 4. One row of plurality of permanent magnets 31 is attached on side yoke 1, while another row of permanent magnets 32 is attached on side yoke 2, forming a magnetic gap 3 between the parallel rows of side yokes. Adjacent ones of plurality of permanent magnets 31 and 32 have alternating magnetic poles.

Figure 8:
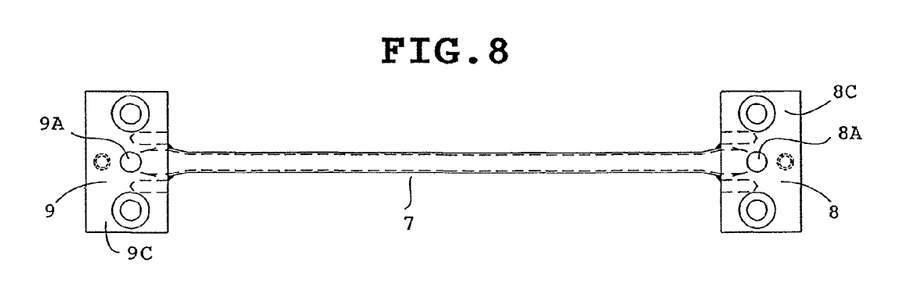
FIG. 8 depicts a plan view of a manifold of the FIG. 1 linear motor.
Figure 9:
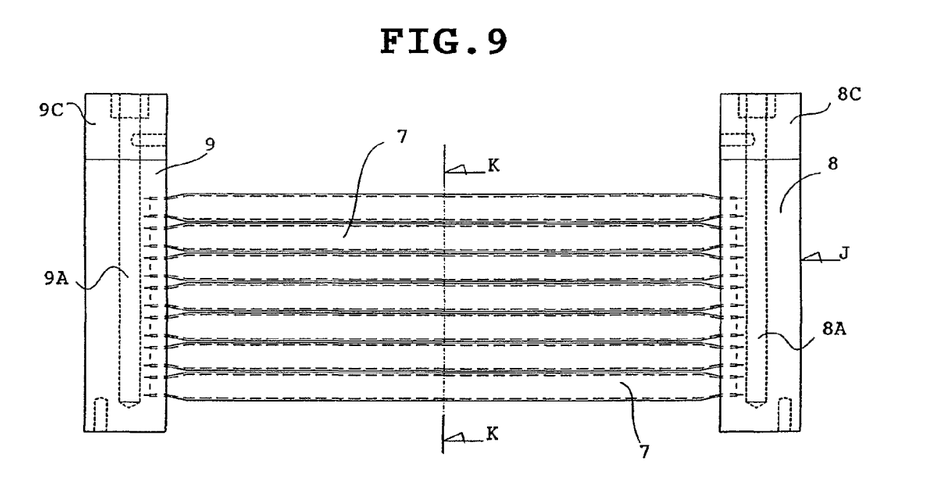
FIG. 9 depicts a side view of the FIG. 8 manifold.
Figure 10:
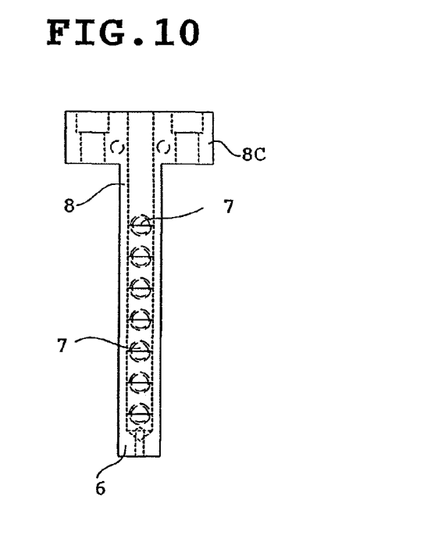
FIG. 10 depicts a front elevation of the FIG. 8 manifold, viewed from point J (from FIG. 9)
Figure 11:
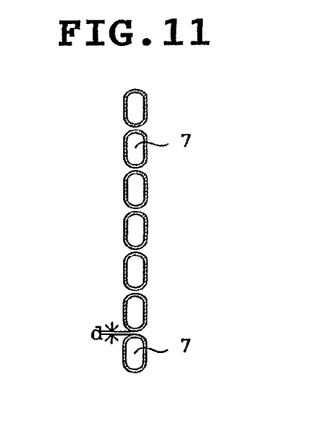
FIG. 11 depicts a cross-section of a cooling pipe, viewed along the line K-K (from FIG. 9)

FIG. 8 depicts a plan view of a manifold of the FIG. 1 linear motor, FIG. 9 depicts a side view of the FIG. 8 manifold, FIG. 10 depicts a front elevation of the FIG. 8 manifold, viewed from point J (from FIG. 9), and FIG. 11 depicts a cross-section of a cooling pipe, viewed along the line K-K (from FIG. 9). As shown in FIGS. 8 to 11, seven horizontal cooling pipes are aligned vertically with respect to the movement direction, although in alternate embodiments of the present invention fewer or more cooling pipes are contemplated. Each of the plurality of cooling pipes 7 has an outer diameter of 4 millimeters in the vertical direction, a thickness of 0.5 millimeters, and a length of 250 millimeters, although other dimensions are possible in alternate aspects of the invention.

As shown in FIG. 11, adjacent ones of plurality of cooling pipes 7 are separated by a small gap of 0.5 mm in order to prevent the flow of eddy currents.

Vertically extending cooling medium inlet and outlet passages 8A and 9A pass through manifolds 8 and 9 in order to distribute cooling medium to the cooling pipes 7. Cooling medium is sent from cooling medium inlet passage 9A to be distributed through the plurality of cooling pipes 7, and is removed through cooling medium outlet passage 8A. Manifolds 8 and 9 respectively have brim sections 8C and 9C for connecting manifolds 8 and 9 to the can 10.

Plurality of cooling pipes 7 are connected to manifolds 8 and 9 by silver brazing or tungsten inert gas ("TIG") welding. Manifolds 8 and 9 and plurality of cooling pipes 7 are made from austenitic stainless steel defined by Japanese Industrial Standards ("JIS") SUS300 (Cr—Ni) or JIS SUS200 (Cr—Ni—Mn). This austenitic stainless steel is non-magnetic, has excellent corrosion resistance and heat resistance, and has better mechanical strength than aluminum or copper alloys.

Figure 12:
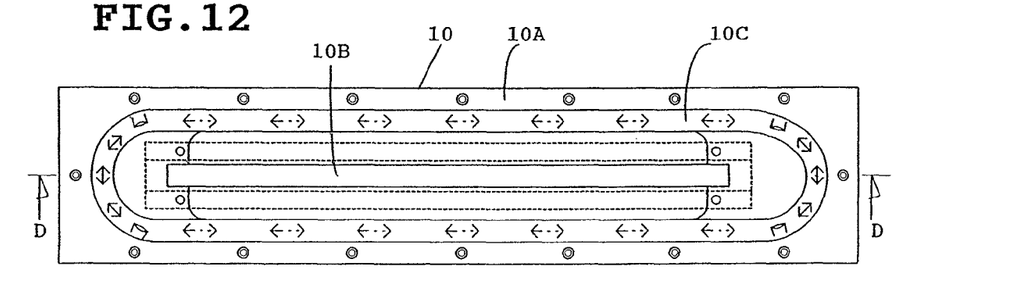
FIG. 12 depicts a front elevation of a can of the FIG. 1 linear motor.
Figure 13:
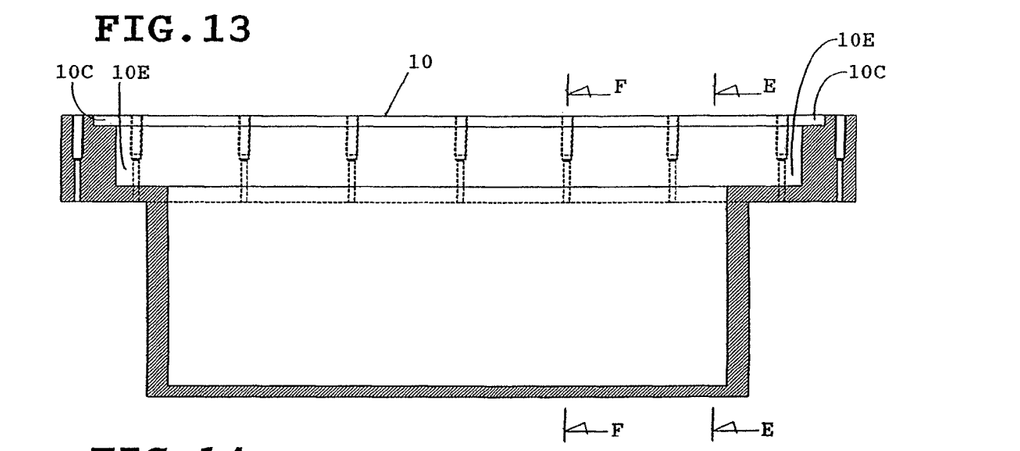
FIG. 13 depicts a side cross-section of the FIG. 12 can, viewed along line D-D (from FIG. 12)
Figure 14:
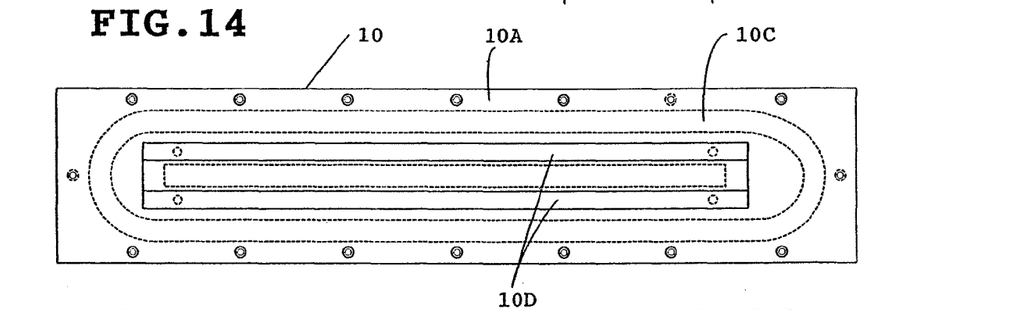
FIG. 14 depicts a bottom view of the FIG. 12 can.
Figure 15:
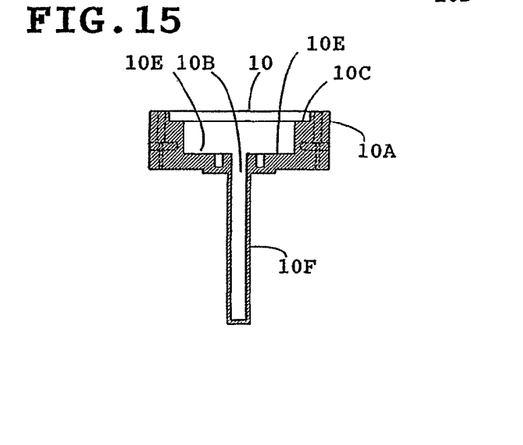
FIG. 15 depicts a side cross-section of the FIG. 12 can, viewed along line E-E (from FIG. 13)
Figure 16:
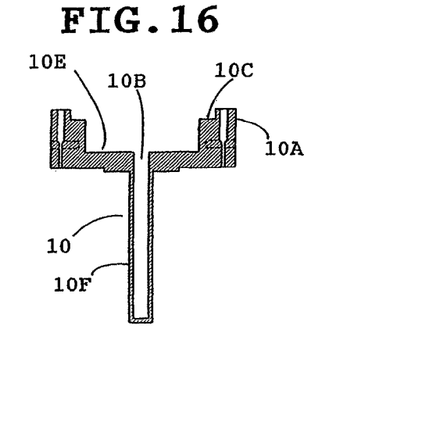
FIG. 16 depicts a side cross-section of the FIG. 12 can, viewed along line F-F (from FIG. 12)

FIG. 12 depicts a front elevation of a can of the FIG. 1 linear motor, FIG. 13 depicts a side cross-section of the FIG. 12 can, viewed along line D-D (from FIG. 12), FIG. 14 depicts a bottom view of the FIG. 12 can, and FIG. 15 depicts a side cross-section of the FIG. 12 can, viewed along line E-E (from FIG. 13). As shown in FIGS. 15 and 16, can 10 includes coil housing section 10F and flange section 10A, and has a T-shaped cross-section. Coil housing section 10F has a deep groove 10B that is thin and long. The deep groove 10B has a width of 8.5 mm, a depth of 70 mm, and a length of 280 mm.

Coil housing section 10F has a width of 12.5 mm, a depth of 80 mm, and a length of 295 mm. The thickness of a side wall of coil housing section 10F is 2.0 mm.

Plurality of coreless coils 5 and plurality of cooling pipes 7 are inserted into deep groove 10B. Flange section 10A is wider than coil housing section 10F, and is joined to cover body 11. Recess 10E formed in flange section 10A receives brim sections 8C and 9C of manifolds 8 and 9, and manifolds 8 and 9 are fixed to can 10 using bolts.

A plurality of bolt holes are formed in the upper surface of flange section 10A in order to fasten cover body 11 to can 10. Seat 10C for receiving O-ring 12 is formed in flange section 10A along the edge of recess 10E. The surface of seat 10C is polished in the direction of arrow marks in FIG. 12.

Figure 17:
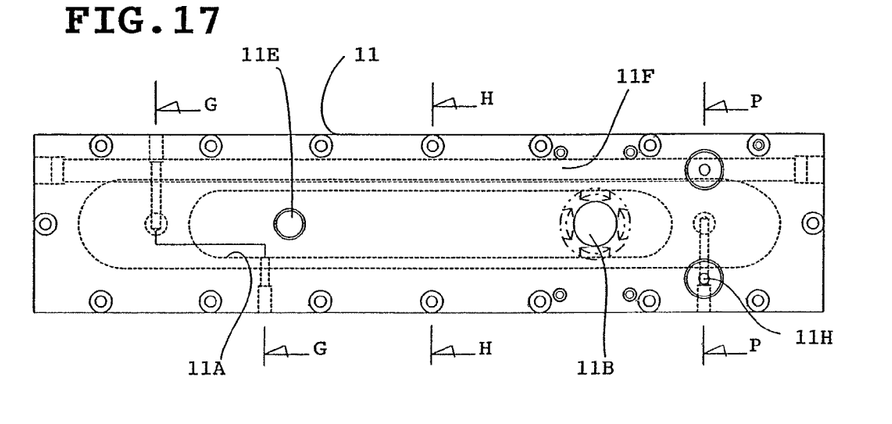
FIG. 17 depicts a front elevation of a cover body of the FIG. 1 linear motor.
Figure 18:
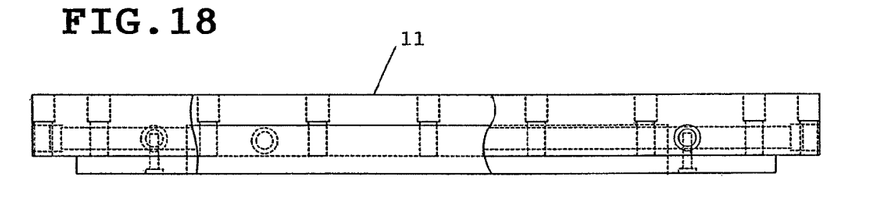
FIG. 18 depicts a partially cut-away side view of the FIG. 17 cover body.
Figure 19:
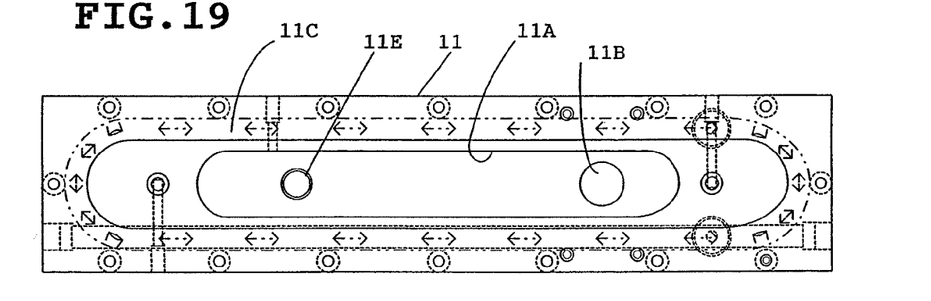
FIG. 19 depicts a bottom view of the FIG. 17 cover body.
Figure 20:
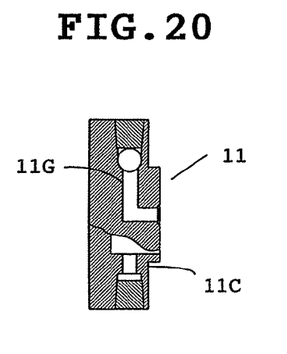
FIG. 20 depicts a cross-section of the FIG. 17 cover body, viewed along line G-G (from FIG. 17)
Figure 21:
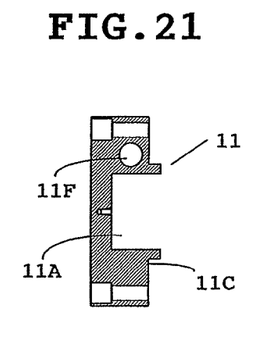
FIG. 21 depicts a cross-section of the FIG. 17 cover body, viewed along line H-H (from FIG. 17)
Figure 22:
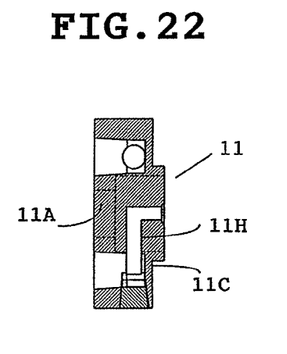
FIG. 22 depicts a cross-section of the FIG. 17 cover body, viewed along line P-P (from FIG. 17)

FIG. 17 depicts a front elevation of a cover body of the FIG. 1 linear motor, FIG. 18 depicts a partially cut-away side view of the FIG. 17 cover body, FIG. 19 depicts a bottom view of the FIG. 17 cover body, FIG. 20 depicts a cross-section of the FIG. 17 cover body, viewed along line G-G (from FIG. 17), FIG. 21 depicts a cross-section of the FIG. 17 cover body, viewed along line H-H (from FIG. 17), and FIG. 22 depicts a cross-section of the FIG. 17 cover body, viewed along line P-P (from FIG. 17).

Cover body 11 seals can 10. The arrow marks in FIG. 19 represent a polished surface. Cover body 11 is joined to the upper surface of flange section 10A, and fastened to can 10 using a plurality of bolts. Recess 11A for housing terminal block 13 is formed in a lower part of cover body 11. Lead lines of plurality of coreless coils 5 pass through terminal block 13 inside recess 11A, and are taken to the outside of cover body 11 via hole 11B.

Seat 11C for receiving O-ring 12, corresponding to seat 10C of can 10, is formed in cover body 11. After can 10 has been sealed using cover body 11, resin or adhesive 6 is injected through hole 11E of cover body 11. Pair of joints 17A and 17B capable of connecting flexible pipes are attached to an upper surface of the cover body 11. Passage 11F communicating with the joint 17A and extending in the horizontal direction, passage 11G connecting the passage 11F to the passage 9A, and passage 11H connecting the passage 8A to the joint 17B are formed in cover body 11. Cover body 11 is joined to the brim sections 8C and 9C using the O-ring. Cooling medium flows from the joint 17A, through the passages 11F, 11G and 9A, the plurality of cooling pipes 7 and passages 8A and 11H, and is expelled from joint 17B.

Figure 23:
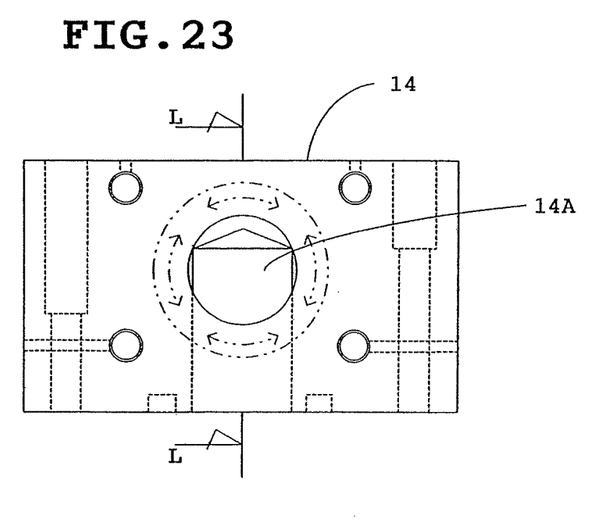
FIG. 23 depicts a front elevation of a block of the FIG. 1 linear motor.
Figure 24:
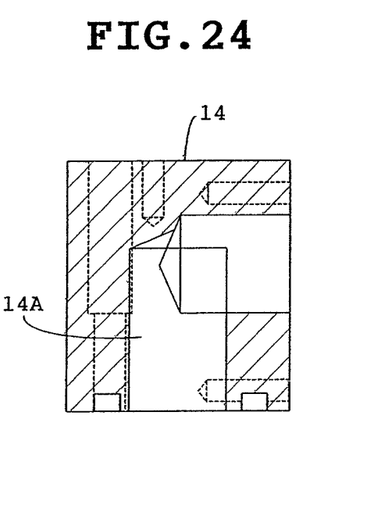
FIG. 24 depicts a side cross-section of the FIG. 23 block, viewed along line L-L (from FIG. 23)

FIG. 23 depicts a front elevation of a block of the FIG. 1 linear motor, and FIG. 24 depicts a side cross-section of the FIG. 23 block, viewed along line L-L (from FIG. 23). Specifically, FIGS. 23 and 24 illustrate cover body block 14, which is attached in an air-tight manner to cover body 11 using a suitable O-ring. The arrow marks in FIG. 23 represent a polished surface. Cover body block 14 has an introduction passage 14A communicating with the hole 11B.

Figure 25:
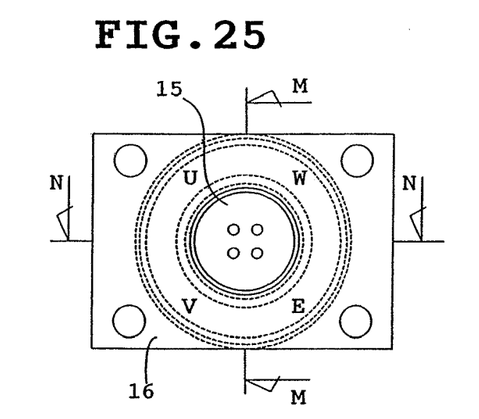
FIG. 25 depicts a front elevation of a current introduction terminal of the FIG. 1 linear motor.
Figure 26:
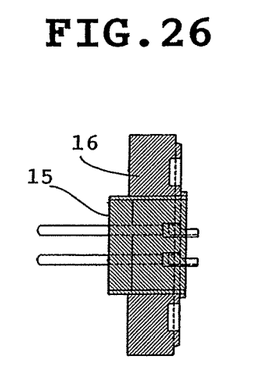
FIG. 26 depicts a cross-section of the FIG. 25 current introduction terminal, viewed along line M-M (from FIG. 25)
Figure 27:
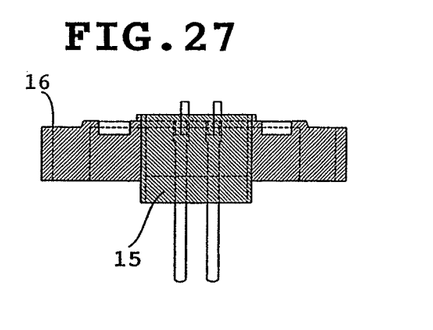
FIG. 27 depicts a cross-section of the FIG. 25 current introduction terminal, viewed along line N-N (from FIG. 25).

FIG. 25 depicts a front elevation of a current introduction terminal of the FIG. 1 linear motor, FIG. 26 depicts a cross-section of the FIG. 25 current introduction terminal, viewed along line M-M (from FIG. 25), and FIG. 27 depicts a cross-section of the FIG. 25 current introduction terminal, viewed along line N-N (from FIG. 25). Specifically, FIGS. 25 to 27 illustrate current introduction terminal 15 attached in an air-tight manner to a front surface of the block 14 using a suitable O-ring. The current introduction terminal 15 includes U-, V-, W- and E-phase terminals. A vacuum flange 16 is fixed to the block 14, and the current introduction terminal 15 is attached to the vacuum block 16 by silver brazing.

According to an alternate embodiment, the present invention is a method of manufacturing a can, such as can 10, in a highly accurate and efficient manner, and without brazing or welding. Can 10 and cover body 11 are made from free-cutting stainless steel defined by JIS SUS303, although in alternate aspects other materials and methods are used. Free-cutting stainless steel does not result in a variation in feeble magnetism, due to cutting heat. Can 10 material made from this type of stainless steel is cut, and a T-shaped cross-section having a width of 12.5 mm for the coil housing section 10F is been formed. Next, seat 10C and recess 10E are machined in the material, and a flange section 10A is formed.

Deep groove 10B of coil housing section 10F is also formed in the material, the deep groove having a width of about 8.5 mm and a depth of about 30-40 millimeters over its entire length and having been gouged out using an end mill attached to a milling machine or a machining center. Since it was not possible to form a deeper groove using an end mill, a tool was changed from an end mill to a drill.

Using the drill, thirty five holes having a depth of 70 mm and a diameter of 7.5 millimeters are drilled about 8 millimeters apart along the entire length of the deep groove. The material is fixed to an electric discharge machine, and the deep groove 10B was formed using an electrode tool made of copper or graphite having a complementary shape to the deep groove. A surface of deep groove 10B is preferably finished to a roughness of 32 µRmax. An electric discharge machined surface of this roughness has varying unevenness, and so the coil assembly is simply fixed to the can using resin or adhesive 6.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of manufacturing a can assembly of a coreless AC linear motor, comprising the steps of:
   providing a workpiece;
   gouging out material from the workpiece to form a deep groove in the workpiece, wherein the workpiece having the deep groove forms a can;
   providing a plurality of coreless coils;
   arranging the plurality of coreless coils in a straight line;
   forming the plurality of coreless coils into a flat plate-shaped block using resin or adhesive, wherein the flat plate-shaped block forms a coil assembly; and
   inserting the coil assembly into the deep groove of the can, wherein the can assembly comprises the can and the coil assembly.

2. The method of manufacturing the can assembly of the coreless AC linear motor of claim 1, wherein the material is stainless steel.

3. The method of manufacturing the can assembly of the coreless AC linear motor of claim 1, wherein the gouging step includes a step of machining a deep groove using an electrode tool.

4. The method of manufacturing the can assembly of the coreless AC linear motor of claim 3, wherein the gouging step includes a step of rough machining a deep groove using an end mill.

5. The method of manufacturing the can assembly of the coreless AC linear motor of claim 3, wherein the gouging step includes a step of rough machining a deep groove using a drill.

\* \* \* \* \*